(12) United States Patent
Maxim et al.

(10) Patent No.: US 11,914,685 B2
(45) Date of Patent: Feb. 27, 2024

(54) MONITORING WEB-BASED EXAMS

(71) Applicant: JAMF Software, LLC, Minneapolis, MN (US)

(72) Inventors: Aaron Maxim, Seattle, WA (US); Samuel Jacob Weiss, Saint Louis Park, MN (US); Jonathan William Yuresko, Union, NJ (US)

(73) Assignee: JAMF Software, LLC, Minneapolis, MN (US)

( * ) Notice: Subject to any disclaimer, the term of this patent is extended or adjusted under 35 U.S.C. 154(b) by 287 days.

(21) Appl. No.: 17/469,820

(22) Filed: Sep. 8, 2021

(65) Prior Publication Data
US 2022/0092156 A1 Mar. 24, 2022

Related U.S. Application Data

(60) Provisional application No. 63/081,079, filed on Sep. 21, 2020.

(51) Int. Cl.
*G06F 21/12* (2013.01)
*G06F 21/62* (2013.01)
*H04L 67/131* (2022.01)

(52) U.S. Cl.
CPC .......... *G06F 21/128* (2013.01); *G06F 21/629* (2013.01); *H04L 67/131* (2022.05); *G06F 2221/2141* (2013.01); *G06F 2221/2149* (2013.01)

(58) Field of Classification Search
CPC ........... G06F 21/629; G06F 2221/2141; G06F 2221/2149; G06F 21/128; H04L 67/131
See application file for complete search history.

(56) References Cited

U.S. PATENT DOCUMENTS

| | | | |
|---|---|---|---|
| 9,875,504 B1 * | 1/2018 | Roe | H04N 7/183 |
| 10,528,709 B1 * | 1/2020 | Shekhtman | H04N 21/41407 |
| 11,717,739 B2 * | 8/2023 | Putnam | G09B 5/06 |
| | | | 434/247 |
| 2011/0223576 A1 * | 9/2011 | Foster | G09B 7/02 |
| | | | 434/362 |

(Continued)

OTHER PUBLICATIONS

Innovation Q (Year: 2023).*

(Continued)

*Primary Examiner* — Samson B Lemma
*Assistant Examiner* — Richard W Cruz-Franqui
(74) *Attorney, Agent, or Firm* — Benesch, Friedlander, Coplan & Aronoff LLP

(57) ABSTRACT

According to certain aspects of the present disclosure, a computer-implemented method is provided. The method includes receiving, at a manager device, data comprising at least one managed device. The method includes identifying, at the manager device, a website associated with the at least one managed device. The method also includes receiving, at a mobile device management server from the manager device, a first message to cause the mobile device management server to initiate transmission of a second message comprising a command that causes the at least one managed device to navigate to the website via a browser, restrict access to other websites other than the website, and enable a camera. Systems and machine-readable media are also provided.

18 Claims, 5 Drawing Sheets

(56) References Cited

U.S. PATENT DOCUMENTS

| | | | |
|---|---|---|---|
| 2012/0077176 A1* | 3/2012 | Foster | G09B 7/02 434/362 |
| 2014/0222995 A1* | 8/2014 | Razden | G09B 7/02 709/224 |
| 2014/0272882 A1* | 9/2014 | Kaufman | G09B 5/065 434/308 |
| 2015/0304484 A1* | 10/2015 | Halmstad | H04W 48/02 455/419 |
| 2016/0307451 A1* | 10/2016 | Logan | H04L 65/60 |
| 2016/0307455 A1* | 10/2016 | Dorman | G09B 7/00 |
| 2017/0149795 A1* | 5/2017 | Day, II | H04W 4/02 |
| 2017/0374130 A1* | 12/2017 | AbiEzzi | G06F 9/45533 |
| 2019/0266909 A1* | 8/2019 | Goodfriend | H04W 24/08 |
| 2020/0401710 A1* | 12/2020 | Wei | G06F 3/14 |

OTHER PUBLICATIONS

NPL History Search (Year: 2023).*
International Search Report and Written Opinion dated Dec. 13, 2021 for PCT Application No. PCT/US2021/049499, 20 pages.

* cited by examiner

MONITORING WEB-BASED EXAMS

CROSS-REFERENCE TO RELATED APPLICATIONS

The present application claims the benefit of priority under 35 U.S.C. § 119 from U.S. Provisional Patent Application Ser. No. 63/081,079 entitled "MONITORING WEB-BASED EXAMS," filed on Sep. 21, 2020, the disclosure of which is hereby incorporated by reference in its entirety for all purposes.

TECHNICAL FIELD

The present disclosure generally relates to mobile devices and management systems, and more specifically relates to monitoring and controlling web-based exams.

BACKGROUND

As remote learning becomes more prevalent, maintaining control of the school or corporation devices take on more importance. As an illustrative, non-limiting example, a teacher may need to administer an examination to the students who are learning remotely. In such an example, the teacher will want to proctor each of the students who are taking the exams. As such, the teacher's proctoring would be enhanced by being able to view the student while he is taking the exam and also being able to view the actual test provided on a website by a browser. In some scenarios, however, remote video sharing software disables, or otherwise does not display, a view from the camera on the student's device when screen sharing is enabled.

The description provided in the background section should not be assumed to be prior art merely because it is mentioned in or associated with the background section. The background section may include information that describes one or more aspects of the subject technology.

SUMMARY

In particular aspects, the present disclosure provides systems and methods that enable a "manager" or "primary" mobile device to perform selected MDM functions with respect to one or more "managed" or "secondary" mobile devices. For example, in an educational context, the manager mobile device may be a tablet computer operated by a teacher or proctor and the managed mobile devices may be tablet computers operated by students. By empowering a teacher to perform certain MDM functions, an overall mobile device experience in the classroom may be improved. For example, teachers may no longer have to communicate with IT administrators for relatively minor issues. For example, a teacher may use his or her mobile device to restrict "focus" at student mobile device(s).

According to certain aspects of the present disclosure, a computer-implemented method is provided. The method includes receiving, at a manager device, data comprising at least one managed device. The method includes identifying, at the manager device, a website associated with the at least one managed device. The method also includes receiving, at a mobile device management server from the manager device, a first message to cause the mobile device management server to initiate transmission of a second message comprising a command that causes the at least one managed device to navigate to the website via a browser, restrict access to other websites other than the specified website, and enable a camera.

According to other aspects of the present disclosure, a system is provided. The system includes a memory comprising instructions and a processor configured to execute the instructions which, when executed, cause the processor to receive, at a manager device, data comprising at least one managed device. The processor is configured to execute the instructions which, when executed, cause the processor to identify, at the manager device, a website associated with the at least one managed device. The processor is configured to execute the instructions which, when executed, cause the processor to transmit, from the manager device to a mobile device management server, a first message to cause the mobile device management server to initiate transmission of a second message comprising a command that causes the at least one managed device to navigate to the website via a browser, restrict access to other websites other than the website, and enable a camera. The processor is configured to execute the instruction which, when executed, cause the processor to display, at the manager device, a view of the browser and a video stream captured by the camera.

According to other aspects of the present disclosure, a non-transitory machine-readable storage medium comprising machine-readable instructions for causing a processor to execute a method is provided. The method includes receiving, at a manager device, data comprising at least one managed device. The method includes identifying, at the manager device, a website associated with the at least one managed device. The method includes transmitting, from the manager device to a mobile device management server, a first message to cause the mobile device management server to initiate transmission of a second message comprising a command that causes the at least one managed device to navigate to the website via a browser, restrict access to other websites other than the website, enable a camera, and activate a screen sharing application. The method includes displaying, at the manager device, a view of the browser and a video stream captured by the camera, wherein the video stream captured by the camera is displayed adjacent to the view of the browser.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. It should be noted that although various aspects may be described herein with reference to educational or corporate settings, these are examples only and are not to be considered limiting. The teachings of the present disclosure may be applied to other mobile device environments, including but not limited to home environments, retail environments, healthcare environments, and other environments well-known in the industry. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The disclosed system provides a solution to proctor web-based examinations without requiring time consuming and laborious setups on the part of teachers and students on their mobile devices. For example, a student will not be required to setup his device before a stressful pre-test time.

The disclosed system addresses a technical problem tied to computer technology and arising in the realm of mobile device management, namely the technical problem of controlling a managed mobile device for monitoring during a web-based exam. The disclosed system solves this technical problem to improve web-based exam proctoring by enabling a manager device to control a managed mobile device during the web-based exam.

Figure 1:
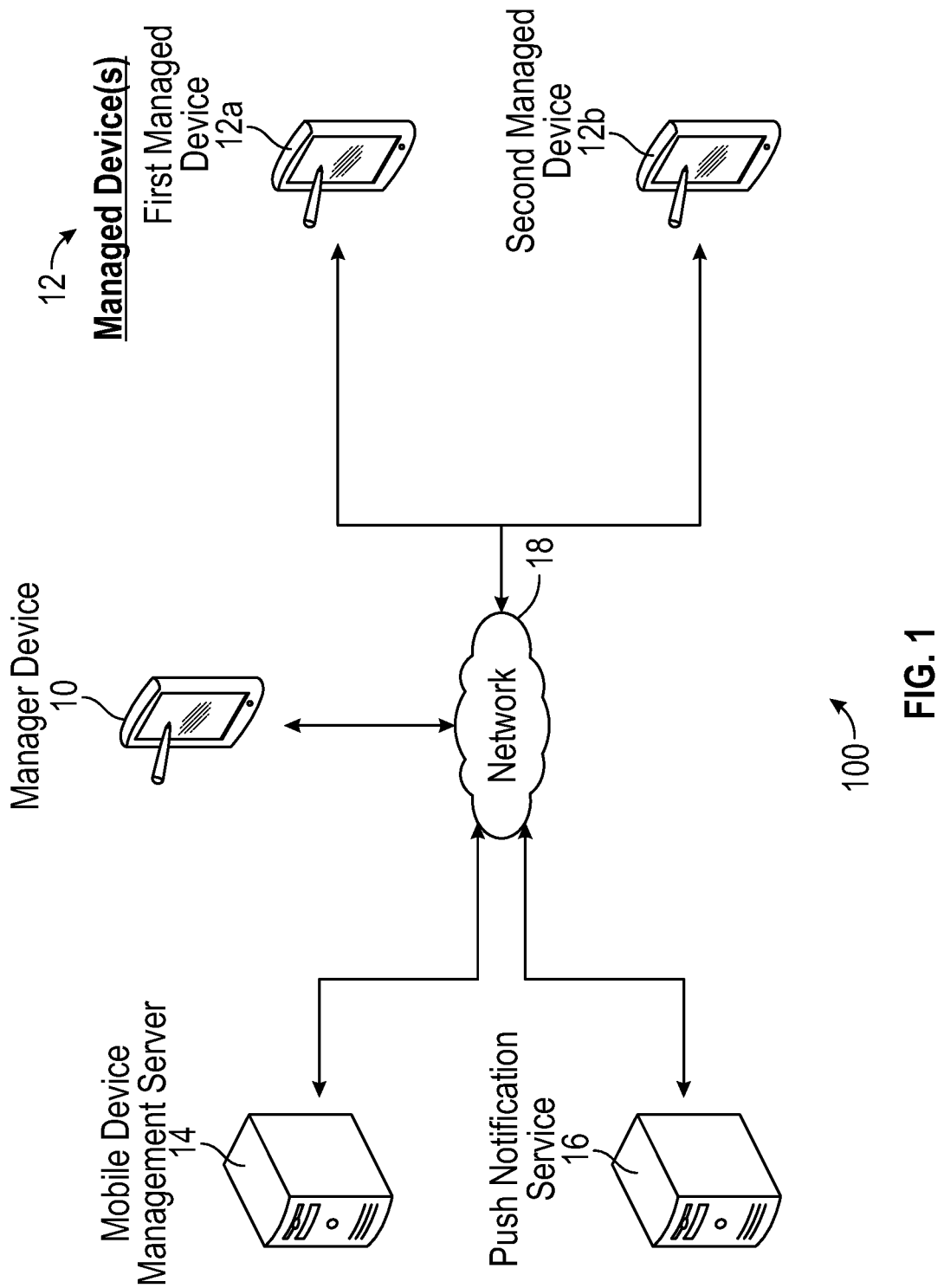
FIG. 1 illustrates an example architecture for enabling a manager device to control operations of managed devices.

FIG. 1 illustrates an example architecture 100 for enabling a manager device to control operations of at least one managed device. For example, the architecture 100 includes a manager device 10, at least one managed device 12, such as a first managed device 12a and a second managed device 12b, a mobile device management server 14, and a push notification service 16 all connected over a network 18. In certain aspects, the mobile device management server 14 may be connected to the push notification service 16 over a separate network.

The mobile device management server 14 can be any device having an appropriate processor, memory, and communications capability for communicating with the manager device 10, the at least one managed device 12, and the push notification service 16. For purposes of load balancing, the mobile device management server 14 may include multiple servers. The push notification service 16 can be any device having an appropriate processor, memory, and communications capability for communicating with the mobile device management server 14 and the at least one managed device 12. The manager device 10, to which the mobile device management server 14 communicates with over the network 18, can be, for example, a tablet computer, a mobile phone, a mobile computer, a laptop computer, a portable media player, an electronic book (eBook) reader, or any other device having appropriate processor, memory, and communications capabilities. Similarly, the at least one managed device 12, such as the first managed device 12a and the second managed device 12b, to which the mobile device management server 14 communications with over the network 18 via the push notification service 16, can be, for example, a tablet computer, a mobile phone, a mobile computer, a laptop computer, a portable media player, an electronic book (eBook) reader, or any other device having appropriate processor, memory, and communications capabilities. In certain aspects, the mobile device management server 14 and the push notification service 16 can be a cloud computing server of an infrastructure-as-a-service (IaaS) and be able to support a platform-as-a-service (PaaS) and software-as-a-service (SaaS) services.

It should be noted that although one manager device 10 and two managed devices, such as the first managed device 12a and the second managed device 12b, are shown in FIG. 1, the present disclosure is not limited to any particular configuration or number of devices. In certain aspects, a different number of manager devices and/or managed devices may be present.

The network 18 can include, for example, any one or more of a personal area network (PAN), a local area network (LAN), a campus area network (CAN), a metropolitan area network (MAN), a wide area network (WAN), a broadband network (BBN), the Internet, and the like. Further, the network 18 can include, but is not limited to, any one or more of the following network topologies, including a bus network, a star network, a ring network, a mesh network, a star-bus network, tree or hierarchical network, and the like.

Figure 2:
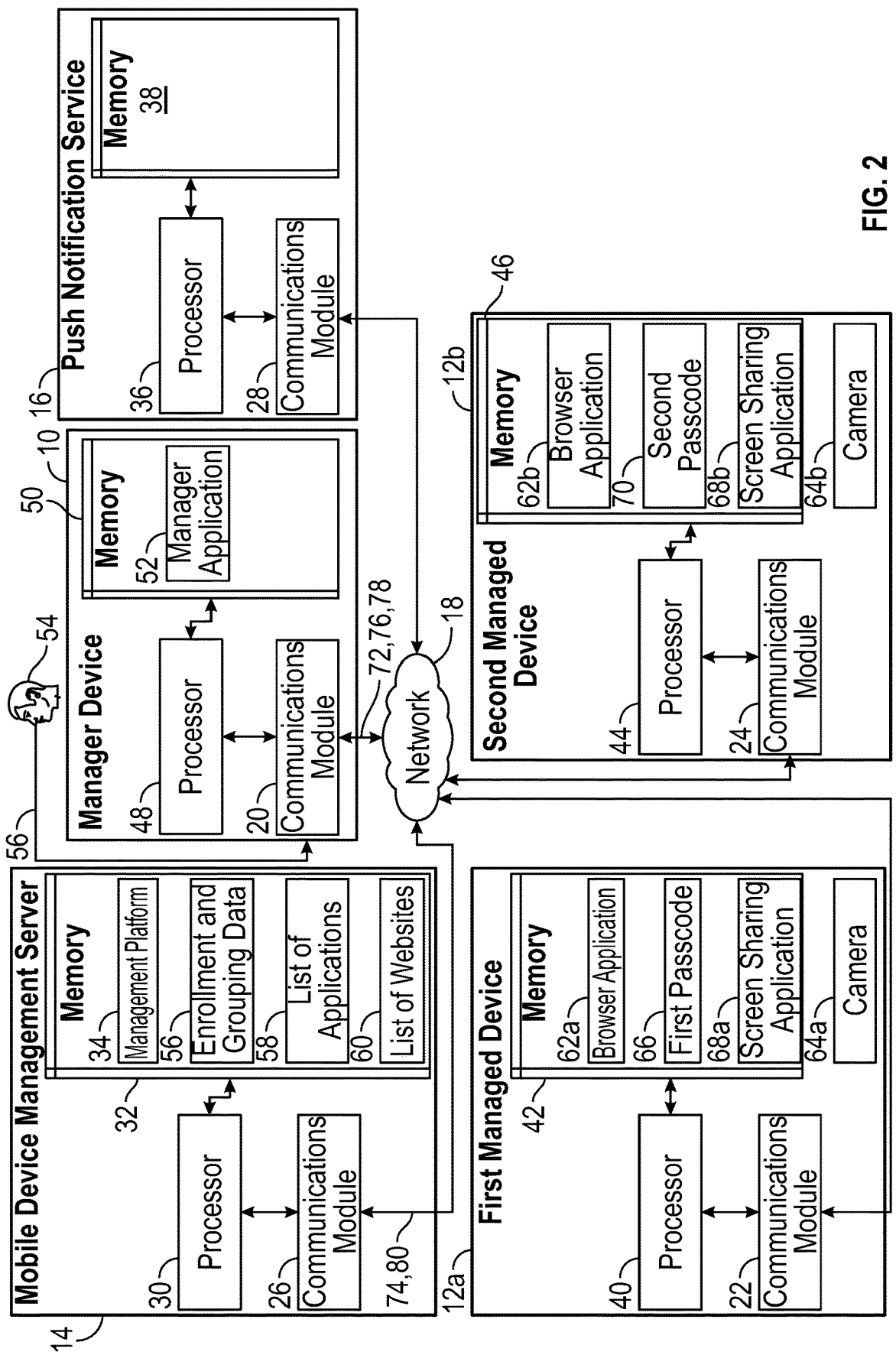
FIG. 2 is a block diagram illustrating the example manager device, managed devices, mobile management server, and push notification service from the architecture of FIG. 1 according to certain aspects of the disclosure.

FIG. 2 is a block diagram illustrating examples of the manager device 10, the first managed device 12a, the second managed device 12b, the mobile device management server 14, and the push notification service 16 in the architecture of FIG. 1 according to certain aspects of the disclosure.

The manager device 10, the first managed device 12a, the second managed device 12b, the mobile device management server 14, and the push notification service 16 are connected over the network 18 via respective communication modules 20, 22, 24, 26, 28. The communication modules 20, 22, 24, 26, 28 are configured to interface with the network 18 to send and receive information, such as data, requests, responses, and commands to other devices on the network 18. The communications modules 20, 22, 24, 26, 28 can be, for example, modems or Ethernet cards.

The mobile device management server 14 includes a processor 30, the communications module 26, and a memory 32 that includes a management platform 34. The processor 30 of the mobile device management server 14 is configured to execute instructions, such as instructions physically coded into the processor 30, instructions received from software in the memory 32, or a combination of both.

The push notification service 16 includes a processor 36, the communications module 28, and a memory 38. The processor 36 of the push notification service 16 is configured to execute instructions, such as instructions physically coded into the processor 36, instructions received from software in the memory 38, or a combination of both.

The first managed device 12a includes a processor 40, the communications module 22, and a memory 42. The processor 40 of the first managed device 12a is configured to execute instructions, such as instructions physically coded into the processor 40, instructions received from software in memory 42, or a combination of both. The first managed device 12a also includes a camera 64a.

The second managed device 12b includes a processor 44, the communications module 24, and a memory 46. The processor 44 of the second managed device 12b is configured to execute instructions, such as instructions physically coded into the processor 44, instructions received from software in memory 46, or a combination of both. The second managed device 12b also includes a camera 64b.

The manager device 10 includes a processor 48, the communications module 20, and a memory 50 that includes a manager application 52. The processor 48 of the manager device 10 is configured to execute instructions, such as instructions physically coded into the processor 48, instructions received from software in memory 50, or a combination of both. The manager application 52 enables a user 54 of the manager device 10 to control, via user input 56, selected functions of the at least one managed device 12, such as the first managed device 12a and the second managed device 12b.

The mobile device management server 14 may correspond to hardware and/or software that implement mobile device management functions. For example, in an educational context, the mobile device management server 14 may manage teacher or proctor devices and student or examinee devices. The mobile device management server 14 may store (or access) enrollment and grouping data 56. The enrollment and grouping data 56 may include enrollee data identifying all mobile devices that are managed by the mobile device management server 14, such as data associated with the manager device 10, the first managed device 12a, and the second managed device 12b.

It should be noted that although various embodiments may be described herein with reference to educational settings, this is for example only and not to be considered limiting. The teachings of the present disclosure may be applied in other mobile device environments, including but not limited to home environments, corporate environments, retail environments, healthcare environments, government environments, organization environments, and other environments well-known in the industry. For example, a corporate employer may use their mobile device to perform mobile device management functions on mobile devices operated by their employees who are taking a performance test.

The mobile device management server 14 may store in the memory 32 or have access to a list of applications 58 and a list of websites 60, which the manager device 10 may select from to restrict focus of at the at least one managed device 12. Restricting focus to an application may include activating the application, ignoring or disabling user input (e.g., touchscreen or button input) that deactivates the application, and ignoring or disabling user input that activates another application. Restricting focus to a website may include navigating to the website (e.g., via a browser application 62a, 62b) and ignoring or disabling user input that deactivates the browser application or navigates away from the website. In an illustrative embodiment, restricting focus to an application or a website may also disable certain user interface (UI) elements at a managed device, such as e-mail or instant message notifications. Restricting focus may also include automatically terminating execution of one or more other applications or processes (e.g., background processes) at a managed device. In certain aspects, for example, restricting focus may include enabling the camera 64a of the first managed device 12a, allowing access to a test website (e.g., via the browser application 62), and restricting access to other websites other than the test website.

The first managed device 12a may include a first passcode 66 stored in the memory 42. For example, the passcode 66 may be used to secure access to the first managed device 12a. When a user (e.g., student) attempts to operate the first managed device 12a, the user may be prompted to input a passcode, and access to the first managed device 12a may not be enabled unless the input passcode matches the first passcode 66. The first managed device 12a may also include one or more apps. The apps may be pre-installed or may be installed after being downloaded (e.g., via an app storefront). In the example of FIG. 1, which corresponds to an educational setting the apps include the browser app 62a and a screen sharing application 68a.

The second managed device 12b may include the browser app 62b, the screen sharing application 68b, and a second passcode 70. When a user (e.g., student) attempts to operate the second managed device 12b, the user may be prompted to input a passcode, and access to the second managed device 12b may not be enabled unless the input passcode matches the second passcode 70.

Figure 3:
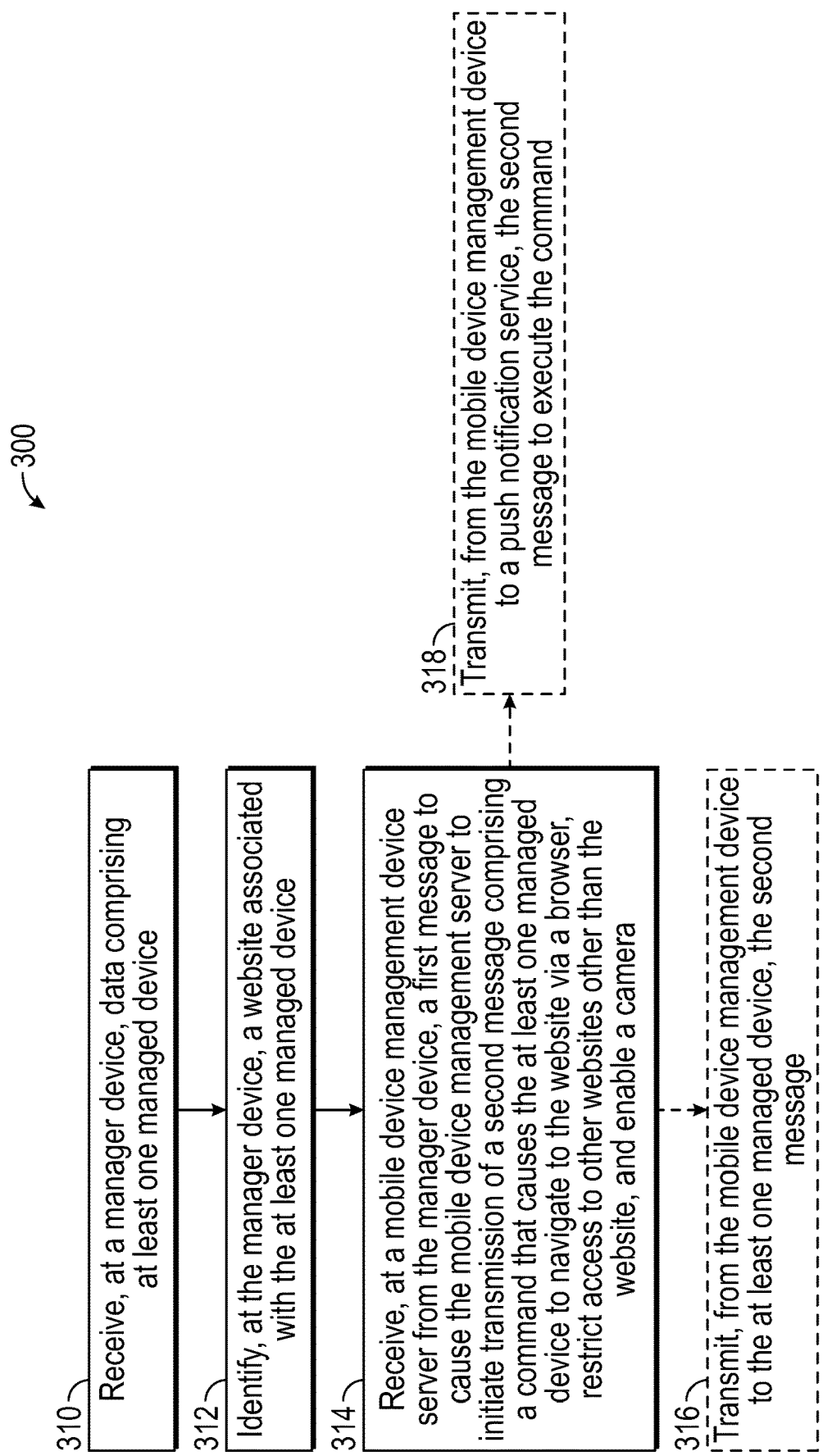
FIG. 3 illustrates an example process for using the example manager device, first managed device, second managed device, mobile management server, and push notification service of FIG. 2.

FIG. 3 illustrates an example process 300 using the manager device 10, the managed device 12, the mobile device management server 14, and, in certain aspects, the push notification service 16. While FIG. 3 is described with reference to FIG. 2, it should be understood that the process steps of FIG. 3 may be performed by other systems.

The process begins by proceeding to step 310 when the processor 48 of the manager device 10 receives enrollment and grouping data 56 comprising at least one managed device 12 (e.g., the first managed device 12a). As depicted at step 312, the processor 48 of the manager device 10 identifies a website (e.g., an assessment website) from the list of websites 60 that is associated with the at least one managed device 12. At step 314, the processor 30 of the mobile device management server 14 receives, from the processor 48 of the manager device 10, a first message 72 to cause the mobile device management server 14 to initiate transmission of a second message 74 comprising a command 76 that causes the at least one managed device 12 to navigate to the website via a browser 62a, restrict access to other websites other than the web site, and enable a camera 64a. In certain aspects, the command 76 also causes the at least one managed device 12 to activate a screen sharing application 68a, to record the view of the browser 62a and the video stream captured by the camera 64a, or transmit the view of the browser 62a and the video stream captured by the camera 64a to the mobile device management server 14, and any combinations thereof.

In certain aspects, for example, the first message 72 causes the mobile device management server 14 to transmit the second message 74 to the at least one managed device 12 to execute the command 76, as illustrated at step 316. In certain other aspects, for example, the first message 72 causes the mobile device management server 14 to transmit the second message 74 to the push notification service 16 to execute the command 76 at the at least one managed device 12, as illustrated at step 318.

In certain aspects, a view of the browser and a video stream captured by the camera 64 is displayed at the manager device 10. In certain aspects, the video stream captured by the camera 64 is displayed adjacent the view of the browser.

During operation, the user 54 (e.g., a teacher or a proctor) may provide the user input 56 to the manager application 52 to perform certain mobile device management functions with respect to the first managed devices 12a and the second managed device 12b. In an illustrative embodiment, the user 54 may be prompted for authentication credentials (e.g., a username, a password, a uniform resource locator (URL) of the mobile device management server 14, etc.) prior to being granted access to the manager application 52. The authentication credentials may be verified by the manager device 10, the mobile device management server 14, or both. In a particular embodiment, communication between the various components of the system 100 occurs via secure (e.g., encrypted) channels. For example, communication in the system 100 may occur via encrypted internet protocol (IP) connections.

As an example of operation, the manager application 52 may execute a "web-based assessment exam" workflow that enables the user 54 to restrict focus at the first managed device 12a and the second managed device 12b. To illustrate, the manager application 52 may display a list of at least one managed device 12, including the first managed device 12a and the second managed device 12b, that are accessible to the user 54 via the manager application 52. Different mobile devices may be accessible to the user 54 at different times. For example, different student devices may be accessible to different teachers at a school depending on which classes students are enrolled in.

The user 54 may select one or more managed device from the list of accessible managed devices. For example, the user 54 may select the first managed device 12a. In response, the manager application 52 may display the list of applications 58 and the list of websites 60. The user 54 may select a particular application or website, indicating that focus at the first managed device 12a is to be restricted to the particular application or web site. For example, the user 54 may select the browser application 62a. In other examples, the user 54 may select the browser application 62a and the screen sharing application 68a. In response, the manager device 10 may send a management message, such as the first message 72, to the mobile device management server 14. The first message 72 may include data identifying the first managed device 12a, the selected application or website (e.g., an assessment website), and a "restrict focus" command 76 to, for example, cause the first managed device 12a to navigate to the assessment website via the browser application 62a, restrict access to other websites other than the assessment website, and enable the camera 64a. In other examples, the command 76 also causes the first managed device 12a to activate the screen sharing application 68a.

In response to receiving the first message 72, the mobile device management server 14 may send a notification request, such as the second message 74, to the push notification service 16. The push notification service 16 may correspond to one or more network accessible servers that are configured to send push notifications, such as the second message 74, to the first managed device 12a. In a particular embodiment, the push notifications, such as the second message 74, may cause the first managed device 12a to check with the mobile device management server 14 to see if there are any commands to be performed by the managed device 12a. For example, commands (e.g., the command 76) selected by the user 54 via the manager device 10 may be queued by the mobile device management server 14 and may be retrieved by the managed device 12a in response to the push notifications, such as the second message 74. In FIG. 2, the first managed device 12a retrieves the command 76 (e.g., the command to cause the first managed device 12a to navigate to the assessment website via the browser application 62a, restrict access to other websites other than the assessment website, and enable the camera 64a) in response to the push notification, such as the second message 74. In an alternate embodiment, the push notifications, such as the second message 74, may include or identify the command to be performed by the first managed devices 12a. For example, the push notifications may utilize an application programming interface (API) to instruct the first managed device 12a to restrict focus to navigate to the assessment website via the browser application 62a, restrict access to other websites other than the assessment website, and enable the camera 64a, (e.g., while a student that is using the first managed device 12a takes an assessment exam associated with the assessment website). In yet another alternate embodiment, a notification or a command may be pushed by the mobile device management server 14 or may be communicated directly from a manager device to a managed device (e.g., via a device-to-device (D2D) connection). In an illustrative embodiment, the command is recognized and executed by a managed mobile device. For example, when the managed mobile device is an iOS® device, the command may be compatible with an iOS® MDM API/protocol, such as a device lock command, a clear passcode command, etc. (iOS is a registered trademark of Cisco Systems, Inc. of San Jose, Calif. and is used by Apple Inc. of Cupertino, Calif. under license).

Figure 4:
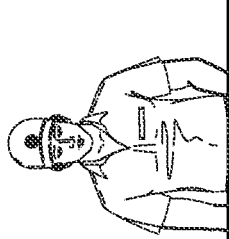
FIG. 4 are example illustrations associated with the example process of FIG. 3.

After the first managed device 12a has restricted focus to navigate to the assessment website via the browser application 62a, restricted access to other websites other than the assessment website, and enabled the camera 64a, the first managed device 12a may send feedback to the mobile device management server 14 including an acknowledgement (ACK). For example, the mobile device management server 14 may transmit the feedback to the manager device 10 such that a video stream 82 captured by the camera 64a and a view 84 of the assessment website via the browser application 62a can be displayed at the manager device 10, as exemplarily illustrated in FIG. 4. In certain aspects, the video stream 82 is displayed adjacent to the view 84 of the website via the browser application 62a. The dimensions of the video stream 82 and the view 84 can be selectively configurable (e.g., a percentage of the shared screen with respect to the entire display can be selected). In certain aspects, the camera 64a is enabled during the entirety of the assessment examination. As another example, the mobile device management server 14 may transmit the feedback to the manager device 10 as a notification that a screen capture mode was activated at the first managed device 12a. In response to receiving the notification, the manager device 10 can selectively transmit a third message 78 to cause the mobile device management server 14 to initiate transmission of a fourth message 80 comprising a warning command that causes display of a warning notification at the first managed device 12a to the mobile device management server 14. Alternatively or additionally, in response to receiving the notification, the manager device 10 can selectively transmit a different third message 78 to cause the mobile device management server 14 to initiate transmission of another fourth message 80 comprising a command that locks the browser application 62a at the first managed device 12a. Different managed devices may be locked to different applications or websites.

Although certain embodiments and workflows are described herein with reference to performing mobile device management for a single managed device, it should be understood that mobile device management may also be performed for multiple devices. For example, the user 54 may select multiple managed devices or a group of managed devices via the manager application 52. The management message, such as the first message 72, may identify multiple managed devices or a group of managed devices, and the push notification service 16 may send push notifications to each managed device.

Figure 5:
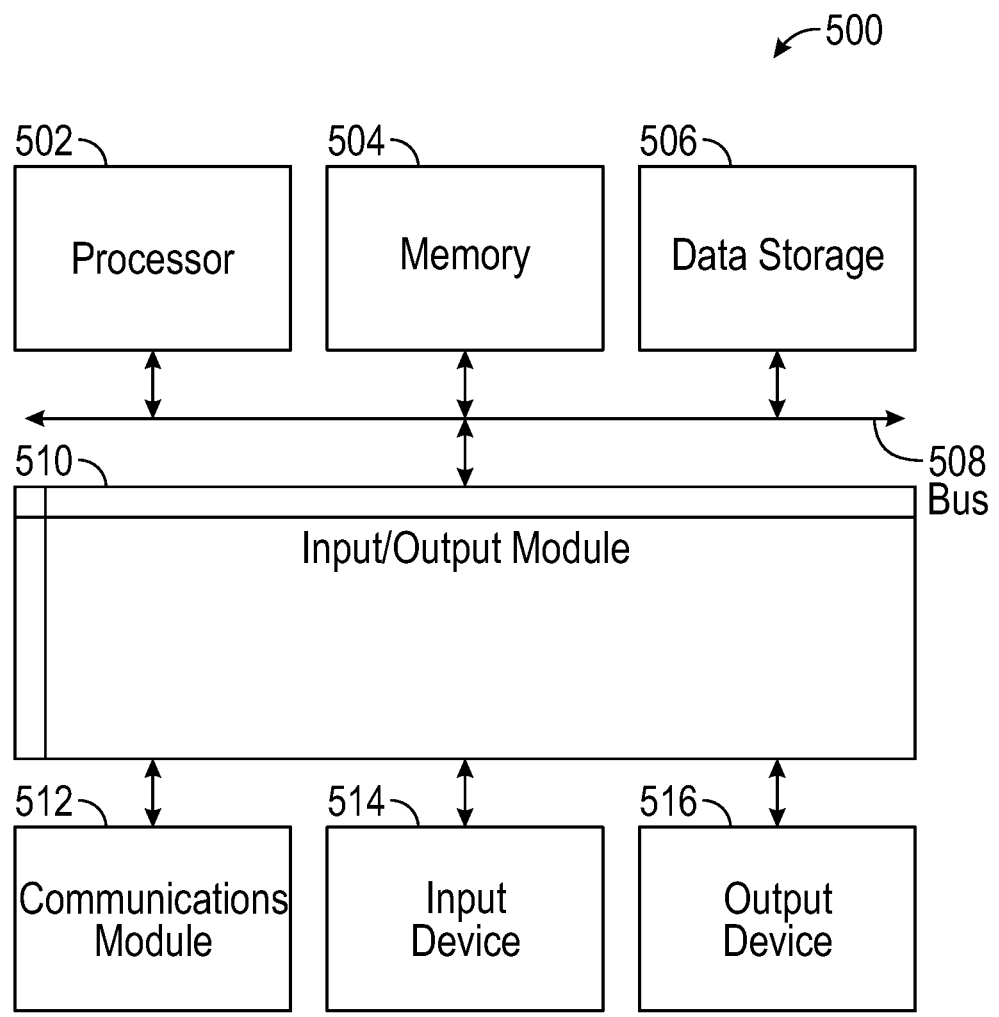
FIG. 5 is block diagram illustrating an example computer system with which the manager device, first managed device, second managed device, mobile management server, and push notification service of FIG. 2 can be implemented.

FIG. 5 is a block diagram illustrating an example computer system 500 with which the manager device 10, the first managed device 12a, the second managed device 12b, the mobile device management server 14, and the push notification service 16 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., the manager device 10, the first managed device 12a, the second managed device 12b, the mobile device management server 14, and the push notification service 16) includes a bus 508 or other communication mechanism for communicating information, and a processor 502 (e.g., the processor 30, 36, 40, 44, 48) coupled with bus 508 for processing information. According to one aspect, the computer system 500 can be a cloud computing server of an IaaS that is able to support PaaS and SaaS services.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., the memory 32, 38, 42, 46, 50), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer readable medium for execution by, or to control the operation of, the computer system 500.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., the communications module 20, 22, 24, 26, 28) include networking interface cards, such as Ethernet cards and modems.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure the manager device 10, the first managed device 12a, the second managed device 12b, the mobile device management server 14, and the push notification service 16 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
    receiving, at a manager device, data comprising at least one managed device;
    identifying, at the manager device, a website associated with the at least one managed device;
    receiving, at a mobile device management server from the manager device, a first message to cause the mobile device management server to initiate transmission of a second message comprising a command that causes the at least one managed device to navigate to the website via a browser, restrict access to other websites other than the website, and enable a camera;
    receiving, at the manager device from the mobile device management server, a notification that a screen capture mode was activated at the at least one managed device;
    selectively transmitting, from the manager device to the mobile device manager server, responsive to receiving the notification, a third message to cause the mobile device management server to initiate transmission of a fourth message comprising a warning command that causes display of a warning notification at the at least one managed device; and
    displaying, at the manager device, a view of the browser and a video stream captured by the camera.

2. The computer-implemented method of claim 1, wherein the first message causes the mobile device management server to transmit the second message to the at least one managed device.

3. The computer-implemented method of claim 1, wherein the first message causes the mobile device management server to transmit the second message to a push notification service to execute the command.

4. The computer-implemented method claim 1, wherein the video stream captured by the camera is displayed adjacent to the view of the browser.

5. The computer-implemented method of claim 4, wherein dimensions of the view of the browser displayed at the manager device are selectively configurable.

6. The computer-implemented method of claim 1, wherein the website is an assessment website comprising an examination.

7. The computer-implemented method of claim 6, wherein the command further includes maintaining the camera enabled during an entire period of the examination.

8. The computer-implemented method of claim 1, wherein the command of the second message further causes the at least one managed device to record the view of the browser and the video stream captured by the camera.

9. The computer-implemented method of claim 1, wherein the command of the second message further causes the at least one managed device to transmit the view of the browser and the video stream captured by the camera to the mobile device management server.

10. The computer-implemented method of claim 1, wherein the command of the second message further causes the at least one managed device to activate a screen sharing application.

11. The computer-implemented method of claim 1, further comprising:
    selectively transmitting, from the manager device to the mobile device manager server, responsive to receiving the notification, a fifth message to cause the mobile device management server to initiate transmission of a sixth message comprising a command that locks the browser at the at least one managed device.

12. A system comprising:
    a memory comprising instructions; and
    a processor configured to execute the instructions which, when executed, cause the processor to:
    receive, at a manager device, data comprising at least one managed device;
    identify, at the manager device, a website associated with the at least one managed device;
    transmit, from the manager device to a mobile device management server, a first message to cause the mobile device management server to initiate transmission of a second message comprising a command that causes the at least one managed device to navigate to the website via a browser, restrict access to other websites other than the website, and enable a camera;
    display, at the manager device, a view of the browser and a video stream captured by the camera, wherein the video stream captured by the camera is displayed adjacent to the view of the browser;
    receive, at the manager device from the mobile device management server, a notification that a screen capture mode was activated at the at least one managed device; and
    selectively transmit, from the manager device to the mobile device manager server, responsive to receiving the notification, a third message to cause the mobile device management server to initiate transmission of a fourth message comprising a warning command that causes display of a warning notification at the at least one managed device.

13. The system of claim 12, wherein the first message causes the mobile device management server to transmit the second message to the at least one managed device.

14. The system of claim 12, wherein the first message causes the mobile device management server to transmit the second message to a push notification service to execute the command.

15. The system of claim 12, wherein dimensions of the browser displayed at the manager device are selectively configurable.

16. The system of claim 12, further comprising instructions to cause the processor to:
    selectively transmit, from the manager device to the mobile device manager server, responsive to receiving the notification, a fifth message to cause the mobile device management server to initiate transmission of a sixth message comprising a command that locks the browser at the at least one managed device.

17. A non-transitory machine-readable storage medium comprising machine-readable instructions for causing a processor to execute a method, the method comprising:
    receiving, at a manager device, data comprising at least one managed device;
    identifying, at the manager device, a website associated with the at least one managed device;
    transmitting, from the manager device to a mobile device management server, a first message to cause the mobile device management server to initiate transmission of a second message comprising a command that causes the at least one managed device to navigate to the website via a browser, restrict access to other websites other than the website, and enable a camera;
    displaying, at the manager device, a view of the browser and a video stream captured by the camera, wherein the video stream captured by the camera is displayed adjacent to the view of the browser;
    receiving, at the manager device from the mobile device management server, a notification that a screen capture mode was activated at the at least one managed device; and
    selectively transmitting, from the manager device to the mobile device manager server, responsive to receiving the notification, a third message to cause the mobile device management server to initiate transmission of a fourth message comprising a warning command that causes display of a warning notification at the at least one managed device.

18. The non-transitory machine-readable storage medium of claim 17, further including instructions for causing the processor to execute the method comprising:
    selectively transmitting, from the manager device to the mobile device manager server, responsive to receiving the notification, a fifth message to cause the mobile device management server to initiate transmission of a sixth message comprising a command that locks the browser at the at least one managed device.

* * * * *